(12) United States Patent
Bates

(10) Patent No.: US 11,072,279 B1
(45) Date of Patent: Jul. 27, 2021

(54) REFLECTIVE DEVICE FOR WARNING OF THE PRESENCE OF A STALLED VEHICLE

(71) Applicant: James C. Bates, Charlotte, NC (US)

(72) Inventor: James C. Bates, Charlotte, NC (US)

(*) Notice: Subject to any disclaimer, the term of this patent is extended or adjusted under 35 U.S.C. 154(b) by 134 days.

(21) Appl. No.: 16/403,260

(22) Filed: May 3, 2019

Related U.S. Application Data

(60) Provisional application No. 62/762,413, filed on May 4, 2018.

(51) Int. Cl.
*B60Q 7/00* (2006.01)
*G02B 5/12* (2006.01)
*G02B 5/124* (2006.01)

(52) U.S. Cl.
CPC ............. *B60Q 7/005* (2013.01); *G02B 5/12* (2013.01); *G02B 5/124* (2013.01)

(58) Field of Classification Search
None
See application file for complete search history.

(56) References Cited

U.S. PATENT DOCUMENTS

| | | | |
|---|---|---|---|
| 3,117,549 A | 1/1964 | Ripepe | |
| 3,672,323 A * | 6/1972 | Hawes | B60Q 7/005 116/28 R |
| 4,603,333 A | 7/1986 | Carlson | |
| 4,977,849 A | 12/1990 | Brinton | |
| 5,195,264 A * | 3/1993 | Johanson | B60Q 1/50 248/911 |
| 5,223,977 A * | 6/1993 | Bennett | G02B 5/124 116/63 R |
| 5,278,735 A | 1/1994 | Her | |
| 5,801,883 A * | 9/1998 | Peters | B62J 6/20 359/523 |
| 6,123,593 A * | 9/2000 | Mercer | B63B 22/18 441/26 |
| 6,378,453 B1 * | 4/2002 | Conway | G09F 17/00 116/173 |
| 7,730,845 B1 * | 6/2010 | Kulp | E01F 9/654 116/63 P |
| 7,987,808 B1 * | 8/2011 | Evans | G09F 21/04 116/28 R |
| 9,489,841 B1 * | 11/2016 | Huggins | G08G 1/04 |
| 9,909,270 B1 * | 3/2018 | Bonifacio | E01F 9/619 |
| 2009/0084306 A1 * | 4/2009 | Noonan, II | E01F 9/688 116/63 T |
| 2014/0174334 A1 * | 6/2014 | Tucker | G09F 17/00 116/173 |

\* cited by examiner

*Primary Examiner* — Jennifer D. Carruth

(57) ABSTRACT

A reflective warning device for warning oncoming traffic of a stalled vehicle in a road, having a supporting member attachable to a stalled vehicle to extend outwardly there from when the device is attached to the vehicle, and a cylindrical display element mounted on the supporting member and having a reflective surface facing oncoming traffic to indicate the presence of a stalled vehicle to oncoming traffic. The device is storable conveniently in a vehicle for use when needed should an emergency arise.

9 Claims, 6 Drawing Sheets

# REFLECTIVE DEVICE FOR WARNING OF THE PRESENCE OF A STALLED VEHICLE

Filing date priority of U.S. Provisional Patent Application, Ser. No. 62/762,413, filed by the present applicant on May 5, 2018, is hereby claimed.

The present invention relates to a reflective warning device for indicating to oncoming traffic of the presence of a stalled vehicle.

BACKGROUND OF THE INVENTION

Vehicles stalled on roadways, which includes road shoulders, present a serious danger of being struck by oncoming vehicles, causing damage to the stalled and the moving vehicles and bodily injury to vehicle occupants and bystanders. This is a particular problem at night or during storms when visibility is significantly impaired.

The common way of indicating that a vehicle is stalled on a roadway is to tie a white towel or other usable article around the driver side exterior door handle of the vehicle or on the windshield, which is not noticeable at night and is not readably noticeable in daylight until the oncoming vehicle is almost abreast of the stalled vehicle. Cones having reflective surfaces are also used, but they are not conveniently stowable in most vehicles and otherwise result in a dangerous wait time before a crew arrives to place the cones in effective positions.

There are multitude non-warning devices mounted on and extending from the top of vehicle windows that have flags or other objects attached, most commonly flags identifying a college or sports team. There are also lighted devices that can be placed on top of vehicles or in the windshields to indicate that the vehicle is being used to deliver a product or to indicate that a vehicle, such as a taxicab, is or is not available for hire.

Also, most vehicles are equipped with blinking tail lights to indicate that the vehicle is stopped for some reason, but they are not sufficiently visible to assure recognition by oncoming traffic.

However, none these known devices serve to provide adequate warnings of the presence of a stalled vehicle needing assistance, and are not readily visible at night sufficient to assure that an accident will be avoided.

SUMMARY OF THE INVENTION

The present invention provides a device that can be stowed conveniently in a vehicle for use in an emergency and, when needed, can be readily attached to a stalled vehicle to provide a visible indication of the circumstance of a stalled vehicle in a roadway from a sufficient distance for the driver of the oncoming vehicle to react appropriately to the circumstance, particularly at night.

The present invention accomplishes this by having a display element attachable to a vehicle and visible to and recognizable by oncoming traffic that there is a vehicle ahead that is stalled in the road. To facilitate this, the display element has a reflective surface that enhances its visibility during daylight, and especially at night, when the headlights of oncoming traffic are reflected back to the driver of an oncoming vehicle at a sufficient distance for the driver to react appropriately.

Broadly, the warning device of the present invention includes a supporting member having an end attachable to a vehicle and extending outwardly therefrom, and a display element mounted on and supported by the supporting member outwardly of the vehicle. The display element has a reflective surface facing oncoming traffic to indicate the presence of the stalled vehicle to oncoming traffic.

In the preferred embodiment of the present invention the reflective surface can be of one color that may be recognizable by vehicle drivers as indicating a warning of a stalled vehicle ahead. The colored surface may be all of one color, multiple colored, or stripes of different colors that can become recognizable from use as indicating a stalled vehicle.

In the preferred embodiment the display element and attached reflective surface are cylindrical to provide an effective viewing width from all directions of oncoming traffic, and the reflective surface is formed of a sheet of high intensity prismatic reflective material secured to the cylindrical display element. When the device is attached to a vehicle, the cylindrical display element and the reflective surface are upstanding for enhanced viewing by oncoming traffic.

Preferably, the end of the supporting member has an outwardly facing slot shaped to mount on the upper edge of a retractable window of a vehicle to mount the device on the vehicle.

BRIEF DESCRIPTION OF THE DRAWINGS

Further features, embodiments, and advantages of the present invention will become apparent from the following detailed description with reference to the drawings, wherein.

DETAILED DESCRIPTION OF THE PREFERRED EMBODIMENTS OF THE PRESENT INVENTION

Figure 1:
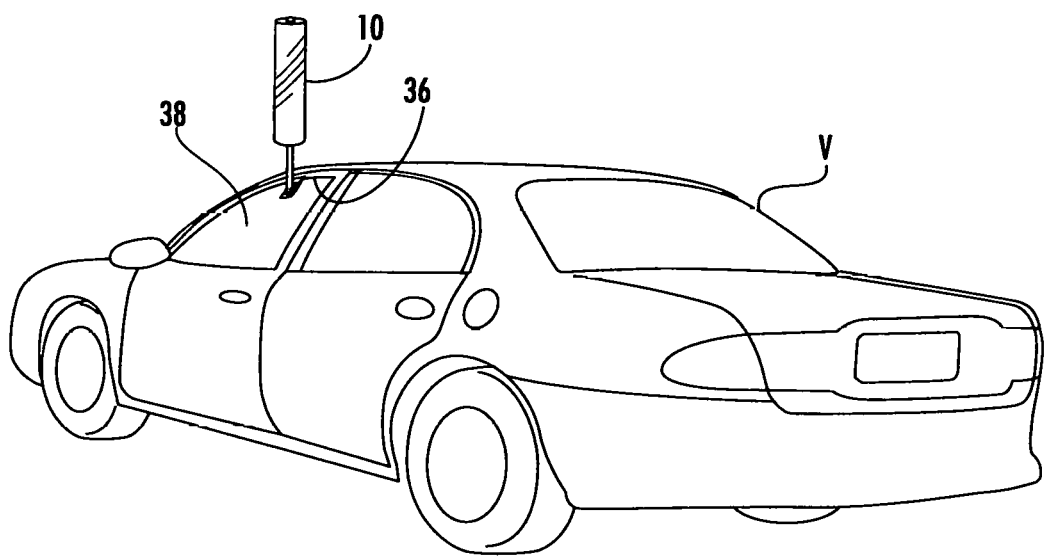
FIG. 1 is a perspective view of a vehicle in the form of an automobile on which is mounted a reflective warning device according to the preferred embodiment of the present invention.
Figure 2:
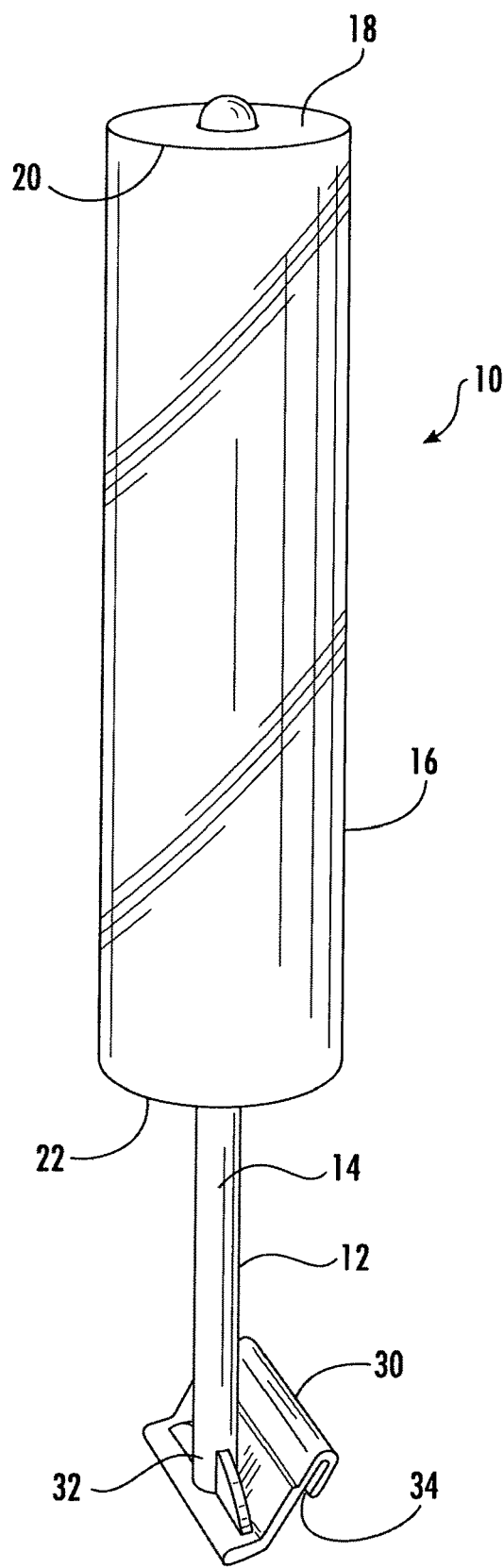
FIG. 2 is a perspective view of the reflective warning device illustrated in FIG. 1.
Figure 3:
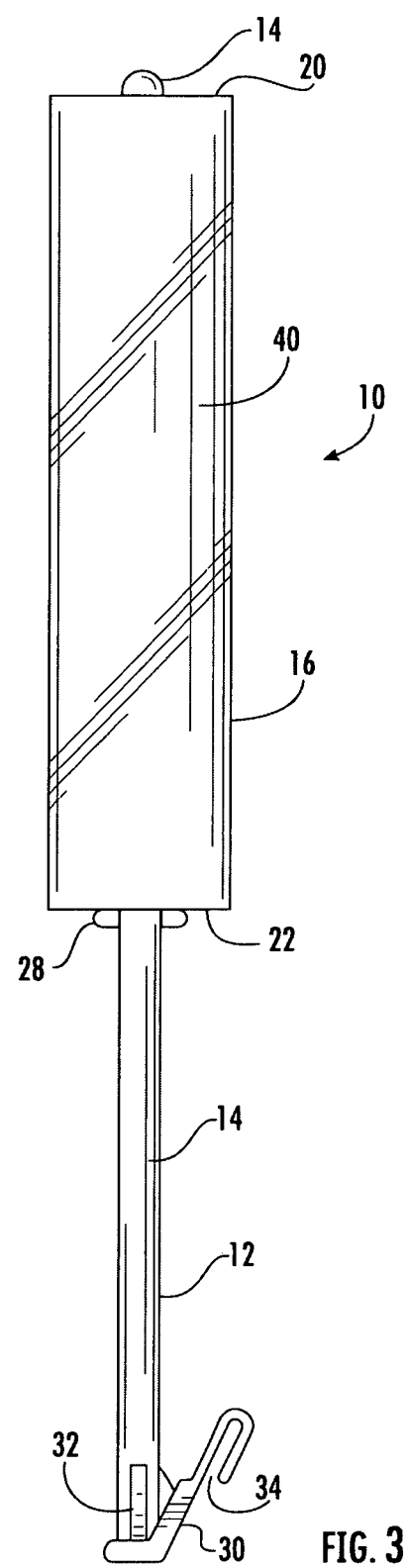
FIG. 3 is a side elevational view of the reflective warning device illustrated in FIG. 1.
Figure 4:
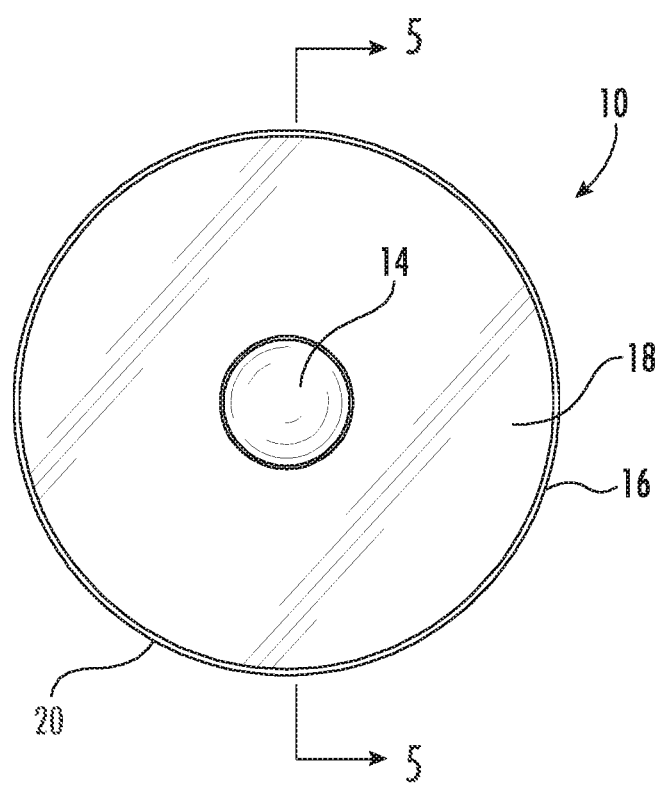
FIG. 4 is a top plan view of the reflective warning device illustrated in FIG. 1.
Figure 5:
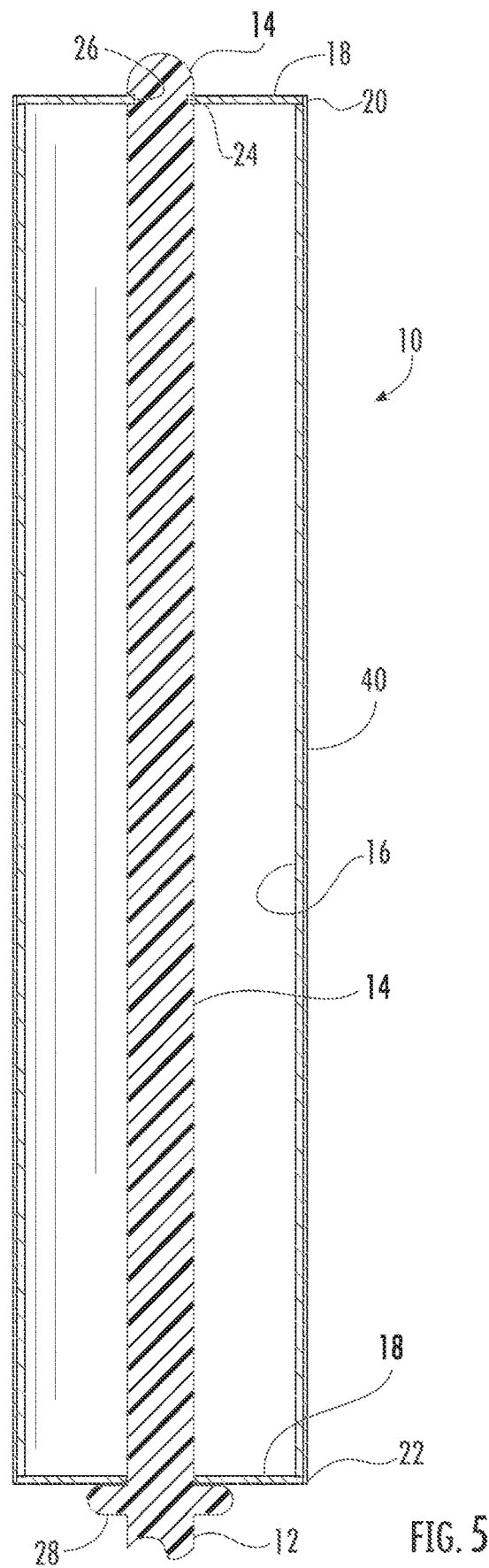
FIG. 5 is a vertical sectional view of the reflective warning device illustrated in FIG. 1, taken along line 5-5 of FIG. 4.

As illustrated in the accompanying drawings, the reflective warning device 10 of the preferred embodiment of the present invention includes an elongated supporting member 12 having an extended end portion in the form of a shaft 14 on which is mounted a display element that is in the form of a hollow cylinder 16, with the shaft 14 extending through and along the axis of the cylinder 16. With this construction, the warning device can be conveniently stowed in a vehicle so that it is readily available for use should it be needed.

The cylinder 16 of the illustrated preferred embodiment has flat discs 18 secured to each end 20, 22 of the cylinder to close the cylinder ends, and through which the supporting member shaft 14 extends. The cylinder 16 is retained on the shaft 14 by engagement of a round cutout 26 in the center of the outer disc 18 in a circular groove 24 formed in the shaft 14 near the outer end 20 of the shaft 14, and by the disc 18 at the inner end 22 of the cylinder 16 abutting against a flange 28 projecting from the cylinder shaft 14. This can alternatively be done by securing an enlarged end cap to the outer end of the shaft extending over an adjacent portion of the outer disc to prevent separation of the cylinder from the shaft.

The important highly reflective characteristic of the device 10 is obtained by a highly reflective surface 40 formed on the cylindrical display element. Preferably, the reflective surface is formed by a sheet of high intensity prismatic reflective material, such as that designated as ASTM Type III, IV or X. With this material the device is highly visible to oncoming traffic, especially at night, to alert oncoming vehicles with ample time to avoid a problem with the stalled vehicle.

To be able to attach the device 10 to a vehicle, it can be adapted with a conventional enlargement 30 at the base 32 of the supporting member 12 with an outwardly facing transverse end slot 34 shaped to be mounted on the upper edge 36 of a retractable window 38 of a vehicle V with the device extending upwardly. The device can also be made to be adapted for attachment at other locations on a vehicle.

With this construction, the device 10 can be attached to a vehicle V quickly when needed, or it can be used as a hand-held signal that can be waived to alert oncoming traffic to the danger of the presence of a stalled vehicle.

The cylindrical characteristic of the reflective surface 40 provides the device with a width for viewing from all directions of oncoming traffic, with the upward extension of the display element providing optimal viewing by oncoming traffic from all directions.

Figure 6:
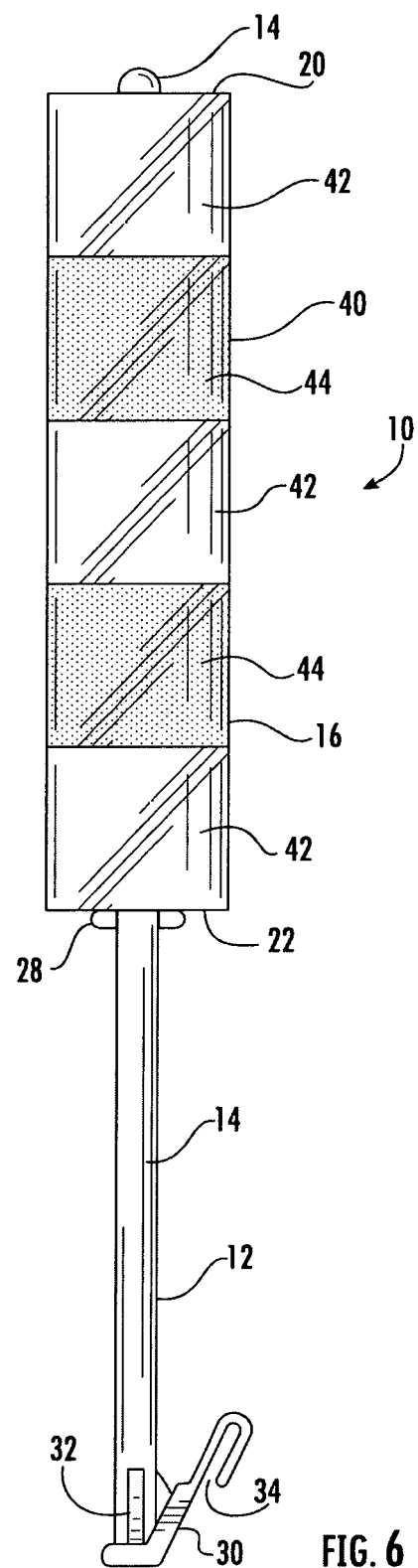
FIG. 6 is a side elevational view of a modified preferred embodiment of the reflective warning device of the present invention.

To enhance visibility of the warning device to alert oncoming traffic to the danger of a stalled vehicle, at least a portion of the reflective surface 40 may be colored, preferably in the same color as used on other traffic control equipment, such as traffic cones. To further attract the attention of oncoming vehicles, the reflective surface 40 may, advantageously, be colored with horizontal stripes of alternating colors 42, 44, as illustrated in FIG. 6.

In a practical form of the preferred embodiment of the present invention, the overall length of the device is about 18", the cylindrical reflective element is about 11" in length and about 2" in diameter, and the supporting member shaft can be in the range of about ½" to ¾" in diameter.

It will be understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications, and equivalent arrangements, the present invention being limited only by the claims appended hereto and equivalents thereof

What is claimed is:

1. A reflective warning device for warning oncoming traffic of a stalled vehicle in a road, comprising:
a supporting member having an attachable end to a stalled or stopped vehicle to extend outwardly therefrom; the attachable end includes a support shaft and an angled slot for attachment to a vehicle door;
a cylindrical reflective indicator element mounted on said supporting member outwardly of said vehicle when the device is attached to a vehicle and having a reflective surface of prismatic reflective material for facing oncoming traffic to indicate the presence of a stalled or stopped vehicle to oncoming traffic;
the support shaft extends upward to support the cylindrical reflective indicator element while maintaining the reflective indicator element substantially upwardly from the vehicle door; and
the reflective warning device does not include a hinge, light source, or suction cup.

2. The reflective warning device of claim 1, characterized further in that said device is of a size to be stowable in a vehicle in readiness for use should said vehicle become stalled.

3. The reflective warning device of claim 1, characterized in that said attachable end of said supporting member has an outwardly facing slot shaped to be mounted on the upper edge of a retractable window of the vehicle.

4. The reflective warning device of claim 1, characterized further in that at least a portion of said reflective surface is colored to enhance its warning visibility to oncoming traffic.

5. The reflective warning device of claim 1, characterized further in that said reflective surface has stripes of alternating colors to enhance its warning visibility to oncoming traffic.

6. The reflective warning device of claim 1, characterized further in that said reflective surface is formed of a sheet of high intensity prismatic reflective material secured to said reflective indicator element.

7. The reflective warning device of claim 1, characterized further in that said reflective surface is cylindrical providing a width for viewing from all directions of oncoming traffic.

8. The reflective warning device of claim 7, characterized further in that said reflective indicator element is a hollow cylindrical tube having opposite ends with closure discs at each end, and said supporting member has a shaft extending through said tube and engaging said closure discs to secure said reflective indicator element on said shaft.

9. The reflective warning device of claim 7, characterized further in that said reflective indicator element extends upwardly when the device is attached to a vehicle to position said cylindrical reflective surface for optimal viewing by oncoming traffic from all directions.

* * * * *